United States Patent [19]
Cava et al.

[11] Patent Number: 5,552,355
[45] Date of Patent: Sep. 3, 1996

[54] COMPENSATION OF THE TEMPERATURE COEFFICIENT OF THE DIELECTRIC CONSTANT OF BARIUM STRONTIUM TITANATE

[75] Inventors: Robert J. Cava, Bridgewater; James J. Krajewski, Raritan; William F. Peck, Bridgewater, all of N.J.

[73] Assignee: AT&T Corp., Murray Hill, N.J.

[21] Appl. No.: 538,317

[22] Filed: Oct. 3, 1995

[51] Int. Cl.$^6$ ............................................. C04B 35/46
[52] U.S. Cl. ............................................. 501/137
[58] Field of Search ................................. 501/137

[56] References Cited

U.S. PATENT DOCUMENTS 5,248,640  9/1993  Sano et al. ........................ 501/137

FOREIGN PATENT DOCUMENTS 1944017  3/1971  Germany ........................... 501/137
4042855  2/1992  Japan ............................. C04B 35/46
7010921  2/1971  Netherlands ....................... 501/134

*Primary Examiner*—David Brunsman

[57] ABSTRACT

A decrease in the temperature coefficient of the dielectric constant (TCK) for polycrystalline ceramics of Barium Strontium Titanate (BST) through admixture with tetragonal bronze type Barium Strontium Niobate (BSN) has been found. For $Ba_{0.5}Sr_{0.5}TiO_3$ ceramics, a 10% admixture of BSN decreases TCK by a factor of 2.5 at 10 MHz, with negligible degradation of the dielectric loss. A 37.5% admixture of BSN decreases TCK by a factor of more than 100. Dielectric constants for the mixtures are in the range of 200–500.

4 Claims, 4 Drawing Sheets

TABLE 1: SUMMARY OF DIELECTRIC DATA FOR $Ba_{.25}Sr_{.75}TiO_3$, $Ba_{.375}Sr_{.625}TiO_3$ OR $Ba_{.5}Sr_{.5}TiO_3$ (BST) CERAMICS COMPENSATED WITH $Ba_{.25}Sr_{.75}Nb_2O_6$, $Ba_{.375}Sr_{.625}Nb_2O_6$, OR $Ba_{.5}Sr_{.5}Nb_2O_6$ (BSN)

| COMPOSITION (MOLE FRACTIONS) | | SINTERING TEMP. (°C) | DIELECTRIC CONSTANT (K) AND DISSIPATION FACTOR (D) AT 20°C | | | | TOTAL CHANGE IN K (%) -20°C TO 60°C | | TCK ppm/°C | | REDUCTION FACTOR FOR TCK | |
|---|---|---|---|---|---|---|---|---|---|---|---|---|
| BST | BSN | | K (100kHz) | D (100kHz) | K (10MHz) | D (10MHz) | 100kHz | 10MHz | 100MHz | 10MHz | 100kHz | 10MHz |
| $Ba_{.25}Sr_{.75}TiO_3/Ba_{.25}Sr_{.75}Nb_2O_6$ | | | | | | | | | | | | |
| 1.0 | 0.0 | 1375 | 395 | .0006 | 397 | .006 | −64.1 | −66.5 | 8010 | 8310 | − | − |
| 0.0 | 1.0 | 1375 | 66 | .009 | 63 | .030 | +7.9 | +12.2 | 988 | 1525 | − | − |
| 0.9 | 0.1 | 1375 | 210 | .002 | 210 | .012 | −37.0 | −35.9 | 4630 | 4490 | 1.7 | 1.9 |
| 0.8 | 0.2 | 1375 | 240 | .004 | 235 | .020 | −29.2 | −25.9 | 3660 | 3230 | 2.2 | 2.6 |
| 0.7 | 0.3 | 1375 | 312 | .008 | 306 | .027 | −22.4 | −16.3 | 2800 | 2040 | 2.9 | 4.1 |
| 0.6 | 0.4 | 1375 | 374 | .012 | 359 | .046 | −12.4 | −3.5 | 1550 | 440 | 5.2 | 18.9 |
| $Ba_{.375}Sr_{.625}TiO_3/Ba_{.375}Sr_{.625}Nb_2O_6$ | | | | | | | | | | | | |
| 1.0 | 0.0 | 1350 | 685 | .0005 | 689 | .007 | −132.7 | −143.6 | 16,590 | 17,950 | − | − |
| 0.0 | 1.0 | 1350 | 343 | .052 | 273 | .111 | +82.5 | +87.8 | 10,320 | 10,980 | − | − |
| 0.62 | 0.38 | 1400 | 313 | .065 | 279 | .049 | −1.9 | +5.7 | 240 | 710 | 69.0 | 25.3 |
| 0.56 | 0.44 | 1400 | 325 | .059 | 289 | .058 | +4.9 | +6.8 | 610 | 850 | 27.0 | 21.1 |
| $Ba_{.5}Sr_{.5}TiO_3/Ba_{.5}Sr_{.5}Nb_2O_6$ | | | | | | | | | | | | |
| 1.0 | 0.0 | 1350 | 1430 | .003 | 1460 | .011 | −217 | −201 | 27,100 | 25,100 | − | − |
| 0.0 | 1.0 | 1350 | 230 | .065 | 183 | .071 | +47.3 | +43.5 | 5910 | 5440 | − | − |
| 0.9 | 0.1 | 1350 | 486 | .004 | 488 | .012 | −79.3 | −80.1 | 9910 | 10,010 | 2.7 | 2.5 |
| 0.8 | 0.2 | 1350 | 379 | .010 | 369 | .028 | −40.4 | −35.5 | 5050 | 4440 | 5.4 | 5.7 |
| 0.675 | 0.325 | 1350 | 326 | .013 | 311 | .038 | −18.3 | −10.5 | 2290 | 1310 | 11.8 | 19.1 |
| 0.625 | 0.375 | 1375 | 297 | .017 | 278 | .048 | −10.2 | −1.7 | 1280 | 210 | 21.2 | 120 |
| 0.60 | 0.40 | 1375 | 267 | .018 | 248 | .051 | −5.7 | +5.3 | 710 | 660 | 38.3 | 38.3 |
| 0.575 | 0.425 | 1375 | 280 | .019 | 261 | .054 | −2.7 | +8.4 | 330 | 1040 | 81.7 | 24.0 |
| 0.55 | 0.45 | 1375 | 275 | .020 | 253 | .064 | +2.1 | +12.6 | 270 | 1570 | 101.2 | 16.0 |
| $SrTiO_3$* | | 1375 | 239 | .000 | 239 | .004 | −25.6 | −25.9 | 3200 | 3200 | − | − |

*INCLUDED FOR COMPARISON PURPOSES

FIG. 4

TABLE 1: SUMMARY OF DIELECTRIC DATA FOR $Ba_{.25}Sr_{.75}TiO_3$, $Ba_{.375}Sr_{.625}TiO_3$ OR $Ba_{.5}Sr_{.5}TiO_3$ (BST) CERAMICS COMPENSATED WITH $Ba_{.25}Sr_{.75}Nb_2O_6$, $Ba_{.375}Sr_{.625}Nb_2O_6$, OR $Ba_{.5}Sr_{.5}Nb_2O_6$ (BSN)

| COMPOSITION (MOLE FRACTIONS) | | SINTERING TEMP. (°C) | DIELECTRIC CONSTANT (K) AND DISSIPATION FACTOR (D) AT 20°C | | | | TOTAL CHANGE IN K (%) -20°C TO 60°C | | TCK ppm/°C | | REDUCTION FACTOR FOR TCK | |
|---|---|---|---|---|---|---|---|---|---|---|---|---|
| BST | BSN | | K(100kHz) | D(100kHz) | K(10MHz) | D(10MHz) | 100kHz | 10MHz | 100MHz | 10MHz | 100kHz | 10MHz |
| $Ba_{.25}Sr_{.75}TiO_3 / Ba_{.25}Sr_{.75}Nb_2O_6$ | | | | | | | | | | | | |
| 1.0 | 0.0 | 1375 | 395 | .0006 | 397 | .006 | -64.1 | -66.5 | 8010 | 8310 | -- | -- |
| 0.0 | 1.0 | 1375 | 66 | .009 | 63 | .030 | +7.9 | +12.2 | 988 | 1525 | -- | -- |
| 0.9 | 0.1 | 1375 | 210 | .002 | 210 | .012 | -37.0 | -35.9 | 4630 | 4490 | 1.7 | 1.9 |
| 0.8 | 0.2 | 1375 | 240 | .004 | 235 | .020 | -29.2 | -25.9 | 3660 | 3230 | 2.2 | 2.6 |
| 0.7 | 0.3 | 1375 | 312 | .008 | 306 | .027 | -22.4 | -16.3 | 2800 | 2040 | 2.9 | 4.1 |
| 0.6 | 0.4 | 1375 | 374 | .012 | 359 | .046 | -12.4 | -3.5 | 1550 | 440 | 5.2 | 18.9 |
| $Ba_{.375}Sr_{.625}TiO_3 / Ba_{.375}Sr_{.625}Nb_2O_6$ | | | | | | | | | | | | |
| 1.0 | 0.0 | 1350 | 685 | .0005 | 689 | .007 | -132.7 | -143.6 | 16,590 | 17,950 | -- | -- |
| 0.0 | 1.0 | 1350 | 343 | .052 | 273 | .111 | +82.5 | +87.8 | 10,320 | 10,980 | -- | -- |
| 0.62 | 0.38 | 1400 | 313 | .065 | 279 | .049 | -1.9 | +5.7 | 240 | 710 | 69.0 | 25.3 |
| 0.56 | 0.44 | 1400 | 325 | .059 | 289 | .058 | +4.9 | +6.8 | 610 | 850 | 27.0 | 21.1 |
| $Ba_{.5}Sr_{.5}TiO_3 / Ba_{.5}Sr_{.5}Nb_2O_6$ | | | | | | | | | | | | |
| 1.0 | 0.0 | 1350 | 1430 | .003 | 1460 | .011 | -217 | -201 | 27,100 | 25,100 | -- | -- |
| 0.0 | 1.0 | 1350 | 230 | .065 | 183 | .071 | +47.3 | +43.5 | 5910 | 5440 | -- | -- |
| 0.9 | 0.1 | 1350 | 486 | .004 | 488 | .012 | -79.3 | -80.1 | 9910 | 10,010 | 2.7 | 2.5 |
| 0.8 | 0.2 | 1350 | 379 | .010 | 369 | .028 | -40.4 | -35.5 | 5050 | 4440 | 5.4 | 5.7 |
| 0.675 | 0.325 | 1350 | 326 | .013 | 311 | .038 | -18.3 | -10.5 | 2290 | 1310 | 11.8 | 19.1 |
| 0.625 | 0.375 | 1375 | 297 | .017 | 278 | .048 | -10.2 | -1.7 | 1280 | 210 | 21.2 | 120 |
| 0.60 | 0.40 | 1375 | 267 | .018 | 248 | .051 | -5.7 | +5.3 | 710 | 660 | 38.3 | 38.3 |
| 0.575 | 0.425 | 1375 | 280 | .019 | 261 | .054 | -2.7 | +8.4 | 330 | 1040 | 81.7 | 24.0 |
| 0.55 | 0.45 | 1375 | 275 | .020 | 253 | .064 | +2.1 | +12.6 | 270 | 1570 | 101.2 | 16.0 |
| $SrTiO_3$* | | 1375 | 239 | .000 | 239 | .004 | -25.6 | -25.9 | 3200 | 3200 | -- | -- |

*INCLUDED FOR COMPARISON PURPOSES

COMPENSATION OF THE TEMPERATURE COEFFICIENT OF THE DIELECTRIC CONSTANT OF BARIUM STRONTIUM TITANATE

FIELD OF THE INVENTION

The present invention relates to materials which have relatively high dielectric constants as well as a decreased temperature coefficient of the dielectric constant.

BACKGROUND OF THE INVENTION

The drive to continuously increase the integration of microelectronic devices has spurred considerable effort toward decreasing the size of the capacitive components in such devices. Future technologies will require the use of materials with higher dielectric constants than are presently employed.

Barium Strontium Titanate, $Ba_{1-x}Sr_xTiO_3$ (BST), has emerged as a leading potential dielectric material for applications such as DRAMs, (T. Eimori et al. IEDM 93 631 (1993)) and is widely studied. Although the dielectric constants of BST perovskites are high, they are also highly temperature dependent. This is a limiting factor in the thermal stability of microelectronics based on the use of BST perovskites.

It is an object of the present invention to provide a dielectric material which has a decreased temperature coefficient of the dielectric constant (TCK) as compared to BST.

SUMMARY OF THE INVENTION

The present invention relates to new dielectric materials having high dielectric constants and decreased temperature coefficient of the dielectric constant (TCK). Also encompassed by the present invention are ceramic capacitors made from the instant dielectric materials by placing such material between a pair of electrodes. The capacitors may be monolayer or multilayer in structure.

Based on the study of bulk polycrystalline ceramics, it has been found that admixtures of small quantities of the tetragonal bronze type niobate $Ba_{1-x}Sr_xNb_2O_6$ (BSN) to BST decreases the temperature coefficient of the dielectric constant (TCK), with negligible change in the dielectric loss. At larger admixtures, much greater compensation is possible, with a concurrent degradation of the loss characteristics. Although the measured bulk dielectric constants decrease, they remain above 250, in the range of what is commonly observed in uncompensated BST thin films.

Because of the differences in properties commonly observed between bulk and thin film BST, thin film BST-BSN dielectrics are expected to follow the same overall behavior, but with the detailed behavior of the compensation of TCK dependent on the details of the thin film morphology.

DETAILED DESCRIPTION OF THE INVENTION

In order to compensate the negative temperature coefficient of the dielectric constant TCK of a high dielectric constant material at temperatures above but near its curie point (as is BST), it is necessary to find a material in thermodynamic equilibrium with that dielectric, with a comparable dielectric constant, and a positive TCK, i.e. a ferroelectric at temperatures below its curie point. This is a long-standing problem in ferroelectric research (T. Negas, G. Yeager, S. Bell and N. Coats, Am. Cer. Soc. Bull. 72 80 (1993)).

For BST, which is a diffuse ferroelectric, a comparably diffuse ferroelectric with higher $T_c$ is required. The requirement that a multiple phase mixture of the two ferroelectrics occurs is a serious limitation on the possible phases employed, as due to the crystal chemistry of perovskite based ferroelectrics, solid solubility rather than phase mixture is the general rule.

Investigations of a variety of chemical systems showed that $Ba_{1-x}Sr_xTiO_3$ perovskites with $T_c$'s below room temperature were in thermodynamic equilibrium with $Ba_{1-x}Sr_xNb_2O_6$ tetragonal bronzes at the same x value with $T_c$'s above room temperature, suggesting that compensation of the TCK of BST should be possible with admixtures of BSN.

The present invention relates to a dielectric material comprising a mixture of $Ba_{1-x}Sr_xTiO_3$ (BST) and $Ba_{1-x}Sr_xNbO_6$ (BSN) in which x is about 0.1 to about 0.9 and the molar ratio of BST to BSN in the mixture ranges from about 0.95:0.05 to about 0.5:0.5. In a preferred embodiment the molar ratio of BST to BSN in the mixture ranges from about 0.9:0.1 to about 0.55:0.45. In an especially preferred embodiment, x is about 0.25 to about 0.5 and the molar ratio of BST to BSN in the mixture ranges from about 0.9:0.1 to about 0.55:0.45.

Having generally described this invention, a further understanding can be obtained by reference to certain specific examples which are provided herein for illustration only and are not intended to be limiting on the scope of this invention.

EXAMPLES

1. A dielectric material comprising a mixture of $Ba_{1-x}Sr_xTiO_3$ (BST) and $Ba_{1-x}Sr_xNb_2O_6$ (BSN) in which x is about 0.1 to about 0.9 and the molar ratio of BST to BSN in the mixture ranges from about 0.95:0.05 to about 0.5:0.5.

2. The dielectric material according to claim 1, wherein the molar ratio of BST to BSN in the mixture ranges from about 0.9:0.1 to about 0.55:0.45.

3. The dielectric material according to claim 1 wherein x is about 0.25 to about 0.5.

4. The dielectric material according to claim 3, wherein the molar ratio of BST to BSN in the mixture ranges from about 0.9:0.1 to about 0.55:0.45.

DESCRIPTION OF THE FIGURES

FIG. 4 Table 1 presents a summary of the TCK data taken from plots such as are shown in FIGS. 1 and 2, the absolute dielectric constants, and the measured dissipation factors (D=1/Q–tanδ) for the ceramic samples.

Bulk ceramic pellets for measurement of dielectric properties were synthesized in a two step process.

First, $Ba_{1-x}Sr_xTiO_3$ and $Ba_{1-x}Sr_xNb_2O_6$ powders (x=0.5, 0.625, 0.75) were synthesized in $Al_2O_3$ from mixtures of $BaCO_3$, $SrCO_3$, $TiO_2$ and $Nb_2O_5$, initially heated at 1200° C., followed by 1300° C. and finally at 1350° C. in air for several nights with intermediate grinding. All starting materials thus reacted were single phase by powder X-ray diffraction, with the exception of $Sr_{0.75}Ba_{0.25}Nb_2O_6$, in apparent disagreement with a published phase equilibria diagram, although the kinetics of the reaction may be very slow (S. Nishigaki, H. Kato, S. Yano and R. Kamimura, Ceramic Bulletin 66 1405 (1987)).

These powders were then thoroughly mixed in the appropriate proportions to produce 1.5 gram ½ inch diameter pellets of composition $(Ba_{1-x}Sr_xTiO_3)_{1-y}(Ba_{1-x}Sr_xNb_2O_6)_y$ for $0 \leq y \leq 1$ and fired in air for 6 hours at temperatures of 1350°–1375° C. At higher temperatures, partial melting occurred for some materials.

The pellets thus produced were not near their theoretical density, and therefore have measured dielectric constants lower than their true ideal bulk values. X-ray diffraction measurements of the pellets after firing showed them to be a mixture of the BST and BSN phases, with the exception of the $Sr_{0.75}Ba_{0.25}$ materials, where other phases were also present. After firing, pellet surfaces were sanded smooth and gallium-indium alloy electrodes were applied with a brush. Dielectric constants were measured with an HP4192A impedance analyzer at frequencies of 100 kHz, and 1 and 10 MHz, at temperatures between −20° and +60° C.

Figure 1:
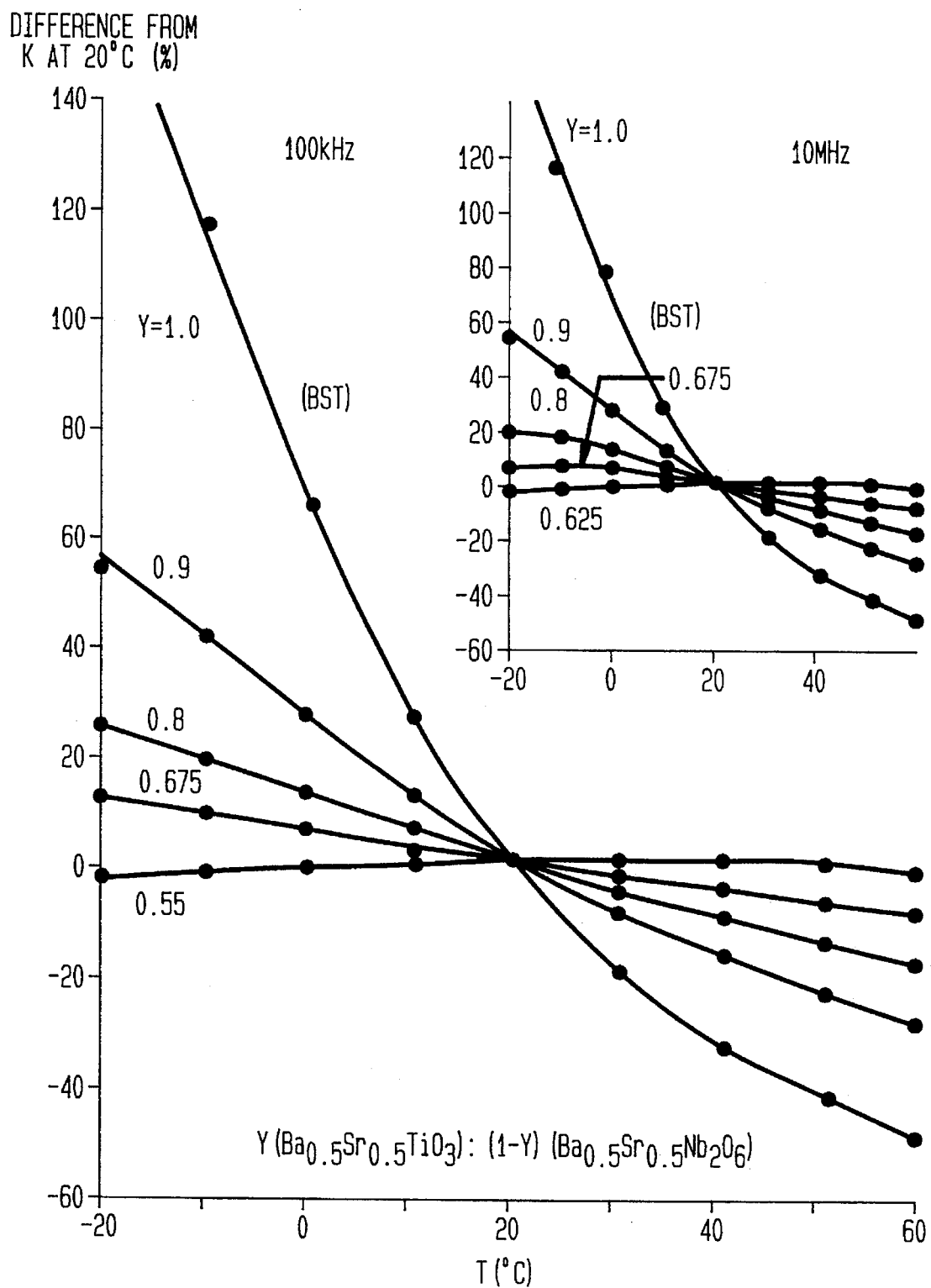
FIG. 1 Measured dielectric constants at 100 kHz (main panel) and MHz (inset) in the temperature range −20° to 60° C. for $Ba_{0.5}Sr_{0.5}TiO_3$- $Ba_{0.5}Sr_{0.5}Nb_2O_6$ bulk ceramics.
Figure 2:
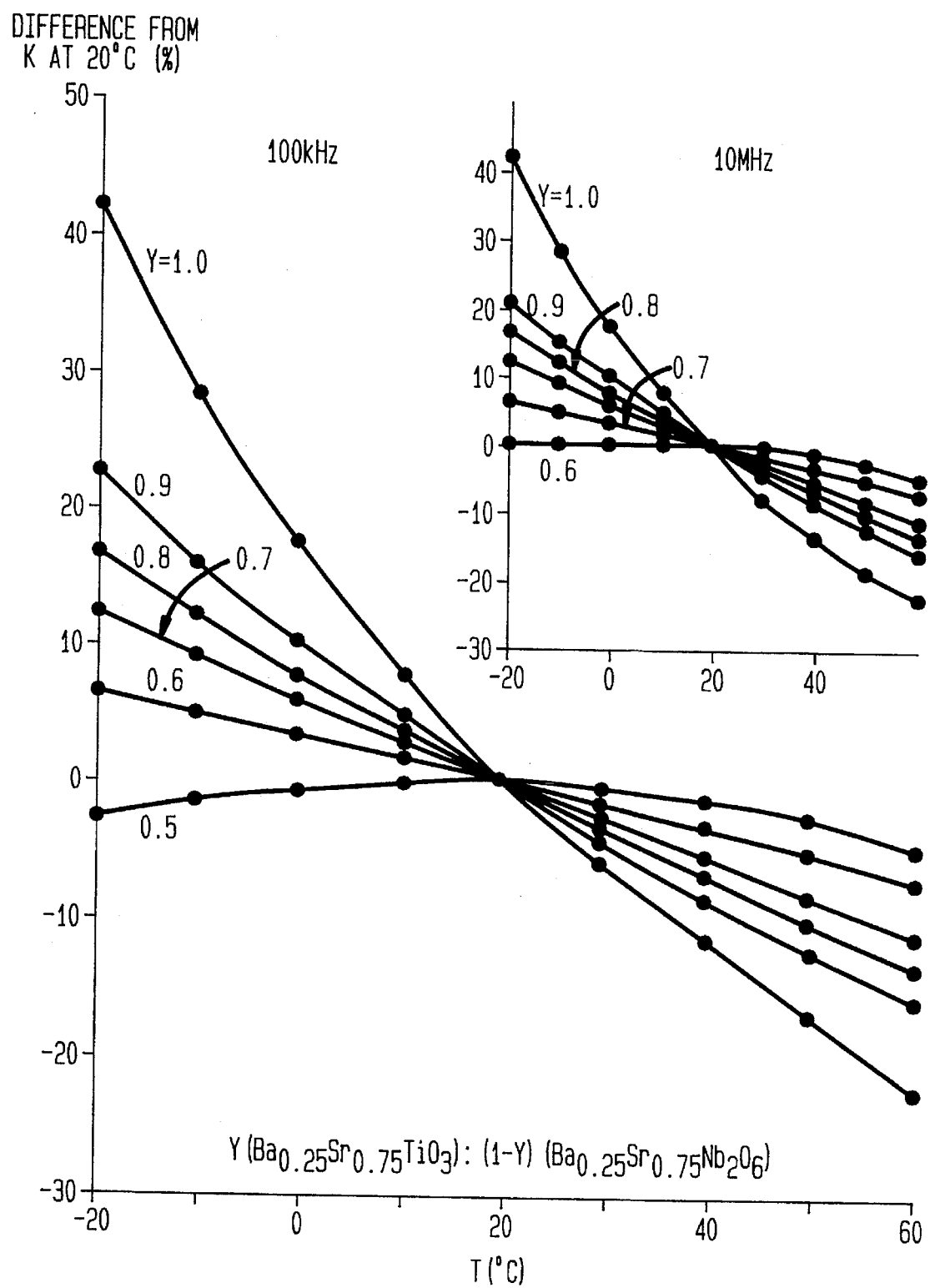
FIG. 2 Measured dielectric constants at 100 kHz (main panel) and 10 MHz (inset) in the temperature range −20° to 60° C. for $Ba_{0.25}Sr_{0.75}TiO_3$- $Ba_{0.25}Sr_{0.75}Nb_2O_6$ bulk ceramics.

The results of measurements of the temperature dependence of the dielectric constants for $(Ba_{0.5}Sr_{0.5}TiO_3)_{1-y}(Ba_{0.5}Sr_{0.5}Nb_2O_6)_y$ and $(Ba_{0.25}Sr_{0.75}TiO_3)_{1-y}(Ba_{0.25}Sr_{0.75}Nb_2O_6)_y$ ceramics are presented in FIGS. 1 and 2. The measured dielectric constants, dissipation factors, TCK's and TCK reduction factors are presented in Table 1 for a wide variety of the materials studied. The figures show $\Delta K/K_{20}$ °C. in percent vs. temperature in the range −20° to 60° C. for frequencies of 100 kHz (main panel) and 10 MHz (inset). The significant and systematic decrease in the temperature dependence of the dielectric constant with increasing BSN content is clearly seen for both sets of materials. The reduction in TCK is large at both frequencies, with differences in the details of the compensation due to the frequency dependence of the dielectric constants in BSN.

FIG. 4 shows table 1 presents a summary of the TCK data taken from plots such as are shown in FIGS. 1 and 2, the absolute dielectric constants, and the measured dissipation factors ($D=1/Q=\tan\delta$) for the ceramic samples.

The high K's, and very high TCK's for the uncompensated BST samples (TCK=27,100 ppm/°C. at 100 KHz for $Ba_{0.5}Sr_{0.5}TiO_3$, for example) are seen. Small BSN additions, e.g. 10–20% mole fractions, decrease TCK by factors of 2–6, with a small cost in dissipation. The decrease in measured dielectric constant is considerable but may be due to a difference in factors such as pellet density or grain size of the BST, similar factors to what causes the decreased measured K's of thin film BST dielectrics. Nonetheless, the dielectric constants remain large, in the range of what is commonly observed in BST thin films.

Figure 3:
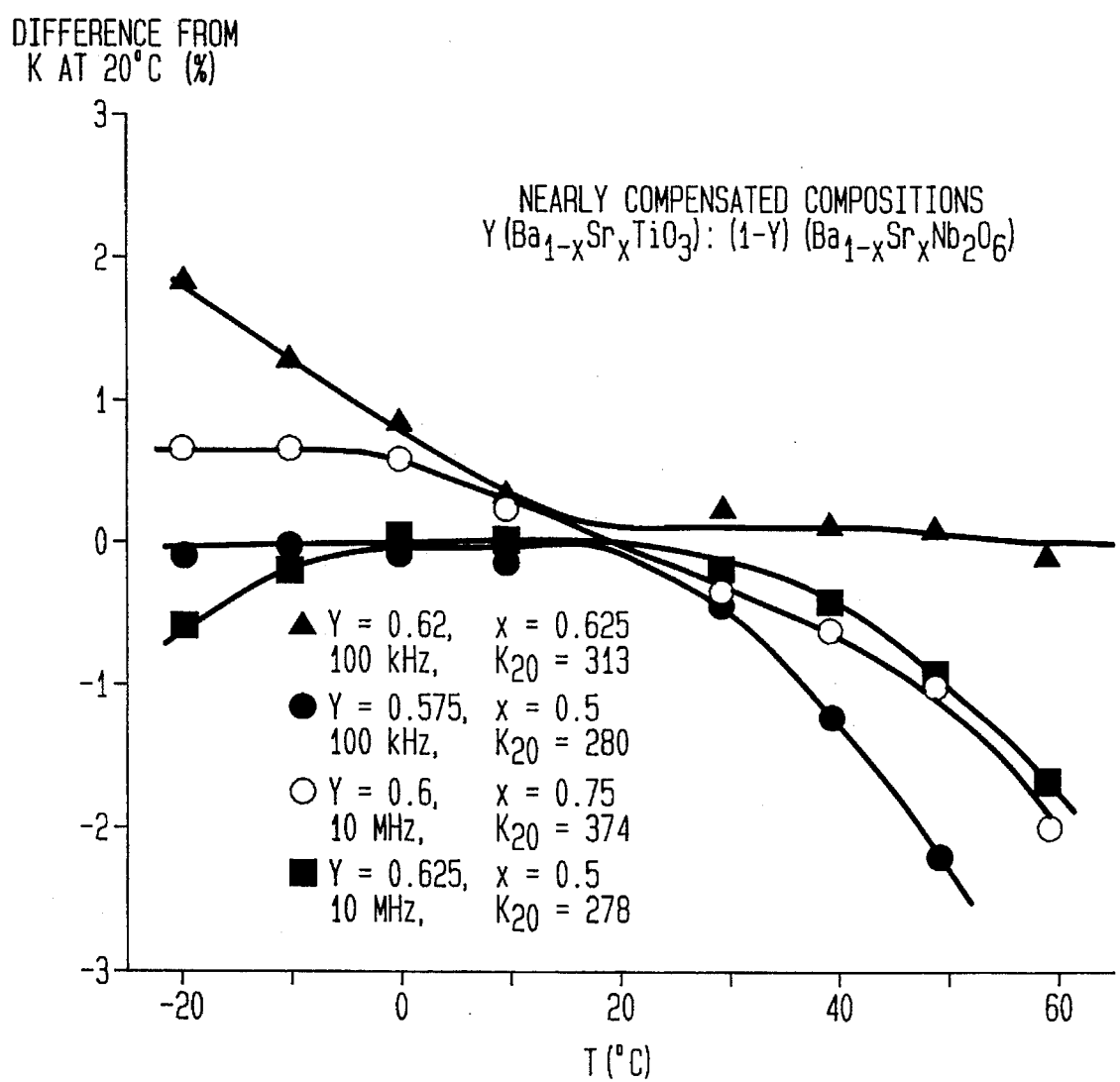
FIG. 3 Temperature dependence of dielectric constants for several nearly compensated BST-BSN ceramics in the range −20° to 60° C.

FIG. 4 shows table 1 also shows a variety of compositions for which a great decrease of the variation of dielectric constant with temperature is possible in bulk ceramics. Those compositions are generally in the vicinity of about 0.6 BST:0.4 BSN. Because in the nearly-compensated state the temperature dependence of K is due to a delicate balance between large positive and negative temperature dependencies, the detailed shapes of the K vs. T curves can be more complicated than those shown in FIGS. 1 and 2. FIG. 3 shows, on a greatly expanded scale, the variation of K with T for several of the best-compensated dielectrics at both 100 kHz and 10 MHz. For several materials the dielectric constant is extremely well compensated for temperature ranges of about 40° C., varying only a few tenths of a percent.

As BST thin films generally display a lower temperature variation of dielectric constant than do bulk materials, the BST-BSN ratio where an acceptable compromise of dielectric constant and temperature variation of dielectric constant will be obtained will depend on the process employed, as do the properties of BST films themselves. Although some of the loss might be improved by chemical additions, as has been done for bulk BST (N. A. Andreeva, O. A. Grushevskaya and V. I. Zhukovskii, Bull. Acad. Sci. USSR, Phys. Ser. 24 1281 (1960)), in the BSN/BST mixtures the loss is likely to be dominated by the intrinsic losses of BST and the ferroelectric BSN. The nonlinear C-V curves already observed for pure BST films should also be observed for BSN-BST films, as should some hysteresis, factors which do not preclude their use in DRAM applications.

The results of the present study show that it is possible to greatly suppress the temperature dependence of the dielectric constant of bulk BST through the addition of BSN, which would in turn greatly improve the thermal stability of devices such as DRAMs employing BST/BSN mixed phase capacitive elements.

The properties of the materials developed in the present invention are such that thin film forms thereof would be of considerable interest to the emerging technology of high dielectric constant applications in microelectronics.

We claim:

1. A dielectric material comprising a mixture of $Ba_{1-x}Sr_x TiO_3$ (BST) and $Ba_{1-x}Sr_x NbO_6$ (BSN) in which x is about 0.1 to about 0.9 and the molar ratio of BST to BSN in the mixture ranges from about 0.95:0.05 to about 0.5:0.5.

2. The dielectric material according to claim 1, wherein the molar ratio of BST to BSN in the mixture ranges from about 0.9:0.1 to about 0.55:0.45.

3. The dielectric material according to claim 1 wherein x is about 0.25 to about 0.5.

4. The dielectric material according to claim 3, wherein the molar ratio of BST to BSN in the mixture ranges from about 0.9:0.1 to about 0.55:0.45.

* * * * *